Aug. 20, 1940.　　　G. A. LYON　　　2,212,038
WHEEL DISK
Filed March 27, 1935　　2 Sheets-Sheet 1
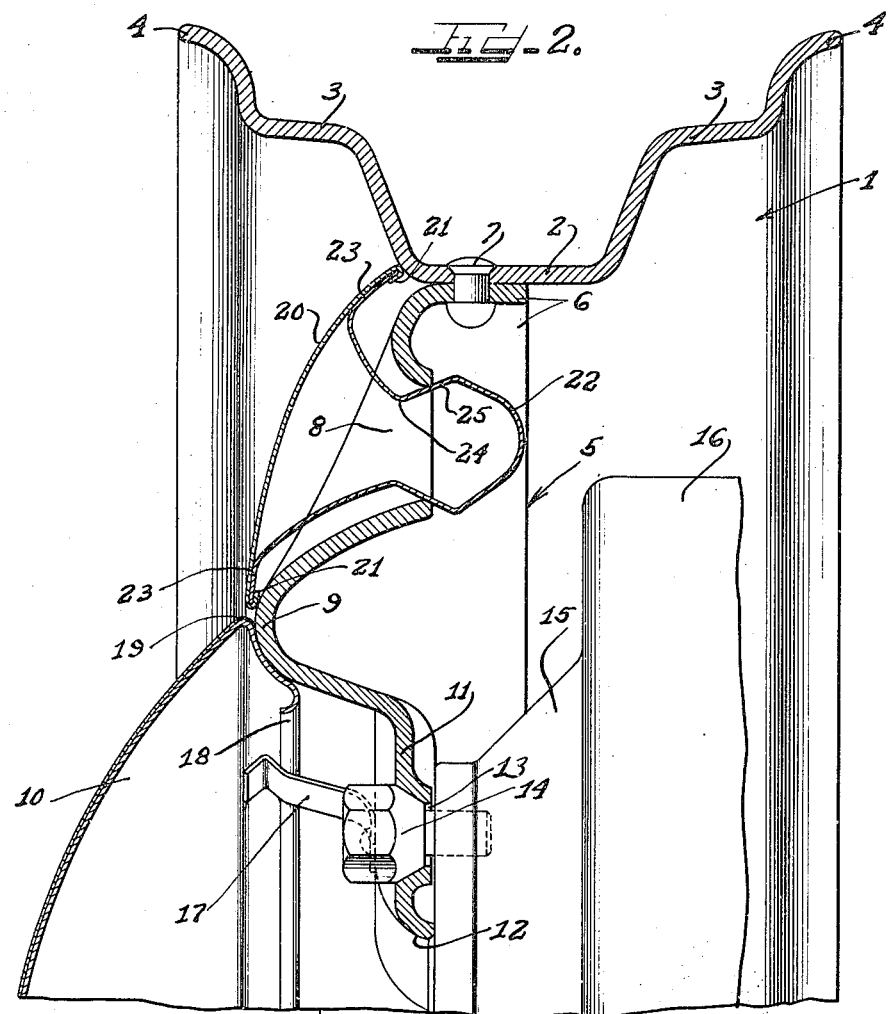
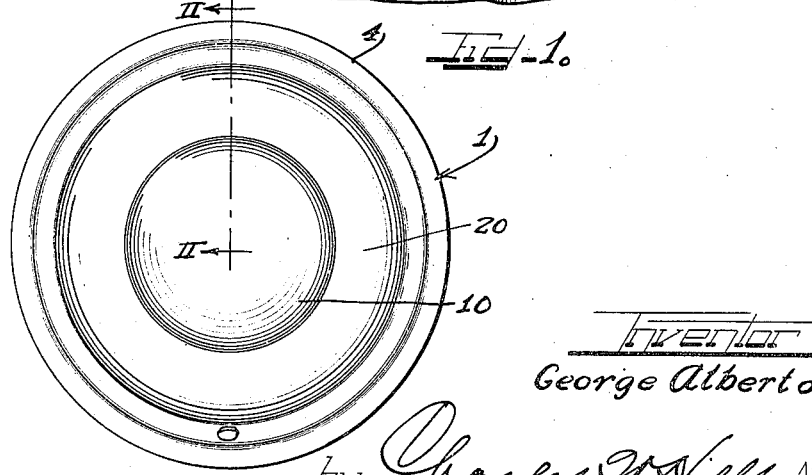
Inventor
George Albert Lyon.
by Charles O'Niell Attys.

Aug. 20, 1940.   G. A. LYON   2,212,038
WHEEL DISK
Filed March 27, 1935   2 Sheets-Sheet 2
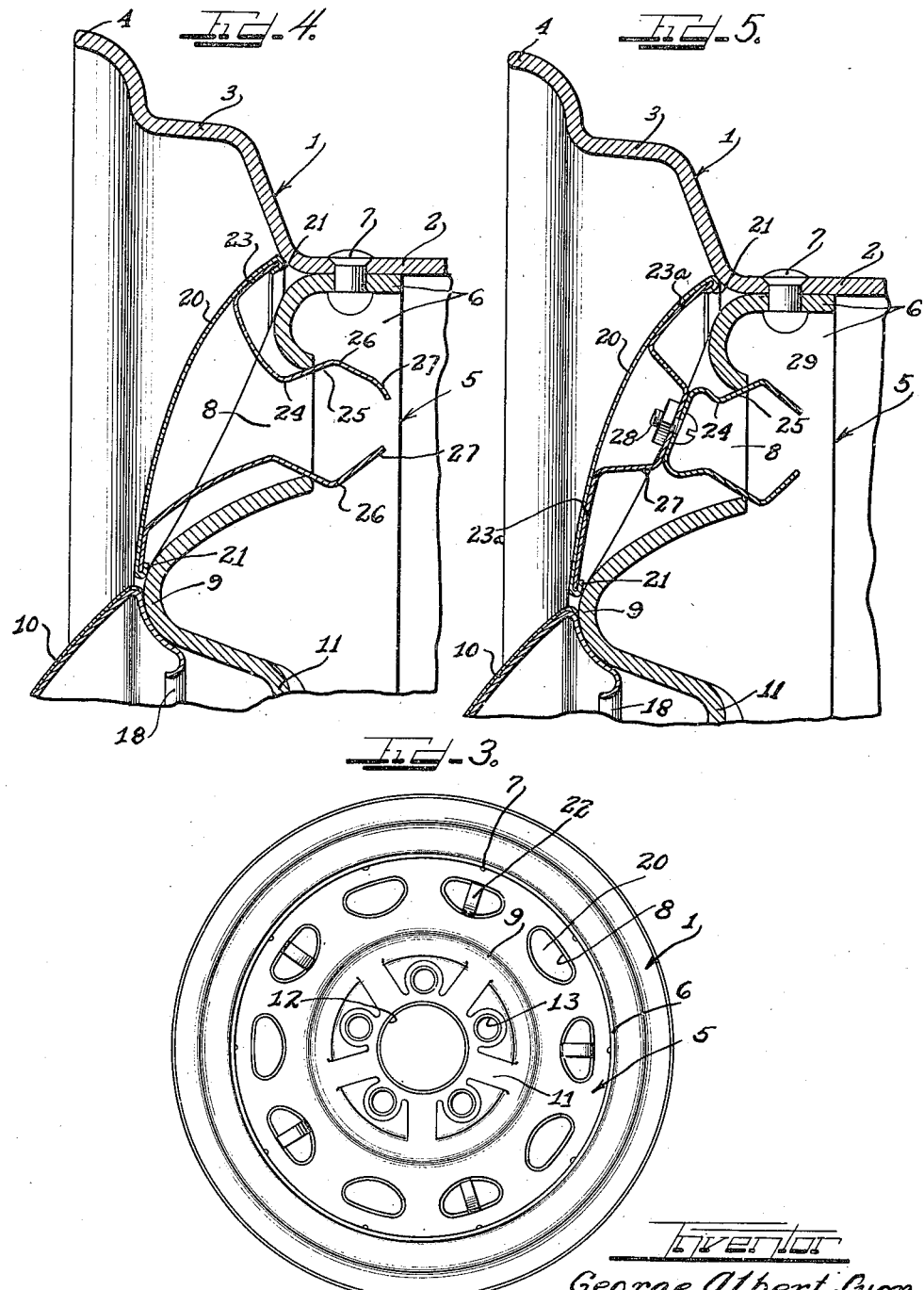

Patented Aug. 20, 1940

2,212,038

UNITED STATES PATENT OFFICE 2,212,038

WHEEL DISK

George Albert Lyon, Allenhurst, N. J.

Application March 27, 1935, Serial No. 13,193

10 Claims. (Cl. 301—37)

This invention relates to improvements in ornamental wheel disks and means for mounting the same, and more particularly, to means for detachably securing an ornamental disk in position overlying the outer side surface of a vehicle wheel.

The present invention is shown and described herein in several different forms associated with a vehicle wheel of the disk type, wherein the wheel normally includes a tire rim usually of the drop center type, and a body portion centrally apertured to provide a hub opening, and extending from this opening to the base flange of the rim to which it is secured in any desirable manner. While in some instances, such disk type wheels have been provided with a plurality of apertures in simulation of the spaces between spokes of a wheel in an endeavor to enhance their appearance, such wheels alone, nevertheless, are not desirably in keeping with a vehicle appointed in stream lines. Various means have been employed for the attachment of decorative members in the nature of ornamental disks overlying a portion or all of the outer side surface of vehicle wheels in an endeavor to dress up the wheels in keeping with the streamlined appointments of other parts of the vehicle. Certain essentials, however, are necessary in the provision of such decorative devices. They must be of such construction that objectionable noises will not arise as a result of their use, such as rattling, vibrations and the like; and they must be very readily and easily attachable to the vehicle wheel so that they will not tend to shift positions as a result of the flexing of the vehicle wheel or rim during the use of the vehicle. Further, they must be capable of being manufactured at a minimum expense, and it is preferable to have them attachable to the vehicle as an accessory as well as a part added to the vehicle during its construction by the manufacturer, and if the device is attachable as an accessory by substantially any person, the mechanism must be so simple and so efficient that mistakes or misadjustmens of the parts are substantially avoided.

I therefore propose to provide a combination vehicle wheel and ornamental disk structure wherein the disk may be readily and easily attached to the wheel and the attaching mechanism is such as to automatically center the disk with respect to the wheel during the uniting of the relative parts.

Another object of my invention is the provision of an ornamental disk for attachment over the side surface of a vehicle wheel including attaching means of a simple and inexpensive character designed to prevent any shifting of the ornamental disk relatively to the wheel and transversely to the axis of the wheel.

It is also an object of this invenion to provide an ornamental disk for attachment to a vehicle wheel, the disk being provided with attaching means so constructed that any tendency of the disk to shift relatively to the wheel during normal operation results in a more effective engagement between the disk and the wheel.

Still a further object of the present invention is the provision of a combination vehicle wheel and ornamental disk structure wherein the body part of the vehicle wheel is provided with an aperture or opening other than the hub opening, and wherein attaching means are provided which unite the disk and wheel and extend through this opening, contacting the edges of the opening in a plurality of places.

It is also an object of this invention to provide an ornamental disk for attachment to a vehicle wheel, the disk being equipped with a plurality of spring clip attaching means for snap-on engagement through apertures in the body part of the wheel, there being engagement with the body part in a plurality of places by the means which extend through a single opening.

In accordance with the general features of this invention, there is provided an ornamental disk structure for use with a wheel of the type embodying rim and body parts, the body part being with one or more openings other than the hub opening. Usually, the openings in the body part of a wheel will be made to simulate the spaces between spokes, although the body part is a metallic disk-like element. Of course, in the event the body part is a more or less uniform metallic disk, a suitable opening or openings may be provided therein in an obvious manner. Spring clip means are provided upon the inner side of the ornamental disc for snap-on engagement through the openings in the body part of the wheel. These spring clips are of such construction that when passed through an opening in the body part, the spring elements will engage the body part on opposite sides of that opening, thus preventing a shifting of the disk relative to the wheel and transversely to the axis of the disk and wheel. The spring clips are further provided with portions sloping away from the axis of the opening through which they extend so that any tendency during the normal use of the vehicle to dislodge these ornamental disks will only result in a more effective engagement of the disks with the wheels. Due to the engagement of the spring elements in a plurality of places through each opening with which they are associated, the disk may be placed upon the wheel by the simple expedient of pressing it into position, the spring elements automatically centering the disk with respect to the wheel. If it is desired to remove the disk from the wheel, it is a simple expedient to exert a suitable prying instrument beneath an edge of the disk and force it off the wheel against the action of the spring element.

Other objects and features of this invention will more fully appear from the following detailed description, taken in connection with the accompanying drawings, which illustrate several embodiments of the invention, and in which:

Figure 1 is a side elevational view of a vehicle wheel and ornamental disk structure embodying features of this invention;

Figure 2 is an enlarged fragmentary vertical sectional view of the structure shown in Figure 1, taking substantially as indicated by the line II—II of Figure 1;

Figure 3 is an enlarged inside elevational view of the structure shown in Figure 1;

Figure 4 is a fragmentary sectional view, similar in character and location to Figure 2, but showing a somewhat modified construction;

Figure 5 is also a fragmentary sectional view illustrating another modified construction.

In the illustrated embodiment of my invention seen in Figures 1, 2 and 3, there is shown a vehicle wheel including a drop-center tire rim generally indicated by numeral 1. This rim includes a base 2, intermediate flanges 3—3, and a pair of arcuate flanges 4—4. The wheel also includes a central supporting portion or body part indicated in general by reference numeral 5. This body part is in the form of a metallic disk and is provided with an inwardly turned peripheral flange 6 secured to the base 2 of the rim in any suitable manner, such as by rivets 7. The body part is also provided with a plurality of apertures or openings 8 which, in this instance, simulate the spaces between spokes, the portions of the metal of the body part adjacent each aperture being depressed inwardly, as seen best in Figure 2, to give the general external appearance of a spoked wheel.

Radially inward of the openings 8, the body part is provided with an outwardly projecting annular bulge 9 which, in addition to other functions, also acts as a seat for a hub cap 10. A fastening flange 11 is formed in the body part of the wheel so as to merge into the radially innermost termination of the bulge 9, the flange being preferably axially offset from the bulge 9. This flange is provided with the usual hub opening 12 and also with a plurality of spaced apertures 13 for the accommodation of attaching bolts 14 by means of which the wheel may be attached to a hub part 15 having associated therewith the usual brake drum 16. Secured to the fastening flange 11 in any desired manner is a plurality of spring clips 17 extending outwardly in position to engage the inner periphery of the hub cap 10 to retain the hub cap removably in position over the hub opening of the wheel. The hub cap is so formed that the annular rolled edge 19 thereof is pressed against the bulge 9 of the body part.

In this instance, I have provided an ornamental disk for disposition over the side surface of the wheel, this disk comprising a transversely arcuate body 20 having underturned annular margins 21 along each edge thereof. The outer circumferential edge of the disk contacts the rim 1 just above the base flange 2, and the inner circumferential edge of the disk contacts the bulge 9 of the body part just outside of the hub cap 10, so that the hub cap 10 may be removed and replaced, or the disk 20 may be removed and replaced, each without interference with the other. Of course, it will readily be understood that if so desired, the disk 20 may be provided with a decorative bead or cushioning element for contact with any desired point along the rim 1, and this disk may also be formed so as to integrally include a structure in simulation of a hub cap thereby eliminating the necessity of using the hub cap 10. Such constructions may be provided in a manner set forth clearly in my co-pending application entitled "Ornamental wheel disk," filed December 17, 1934, Serial No. 757,781, it being appreciated that the size of the disk or the amount of wheel surface concealed by the disk is variable to a considerable degree within the purview of this invention.

In order to readily and very effectively attach the disk 20 to the wheel, I have provided the disk, in this instance, with a plurality of spring clip elements 22, each of which is preferably a continuous strip of metal in the general configuration of a deformed U. These securing elements 22 are preferably positioned symmetrically around the disk so that each will readily find its way through one of the openings 8 in the body part of the wheel when the disk is applied to the wheel.

Each spring element is provided with a pair of opposed ends 23—23, shaped complementally to the arc of the disk 20 and disposed against the inner face of the disk, the ends being clamped in position beneath the underturned margins 21—21 of the disk. Each arm of the spring element slopes inwardly from its respective end 23 to the apex 24 of a bend in the arm, and from this bend the arm is provided with a relatively straight portion 25 sloping outwardly from the axis of the respective opening 8. The portions 25 of the arms are joined with any suitable arcuate formation.

The portions 25 of the spring elements 22 establish contact with the body part of the wheel, preferably on opposite sides of the openings 8. With the edge of an opening 8 contacted at relatively opposite points by a spring element 22, it will be seen that when the disk is forced into position, these spring elements will automatically center the disk relatively to the wheel and will also prevent bodily shifting of the disk relatively to the wheel and transversely to the axis of the wheel while the vehicle is in use.

It will be appreciated that the spring elements 22 are sufficiently flexible to be forced through the openings 8 and after being forced a certain distance through these openings, the spring elements will expand with a snap-like action, effectively anchoring the disk to the wheel. Due to the sloping contact portions 25, any tendency during operation of the vehicle towards dislodgement of the disk only results in a more effective engagement of the disk with the wheel, the resiliency of the spring elements, together with the slope of the portions 25, continuously urging the disk into tighter engagement with the wheel. The structure shown in Figures 1, 2 and 3 may be removed from the wheel by inserting a suitable pry under either annular edge of the disk and forcing the same off the wheel against the action of the spring elements. However, with both arms of each spring element joined so that each element is a one-piece element, removal of the disk will be somewhat more difficult than if the arms were not joined.

Unwelcome noises which sometimes result due to vibration, rattle or the like, in a combination wheel and ornamental disk structure, are effectively eliminated by the constant urging inwardly of the disk by the spring clips, the disk always being held tightly in position on the wheel.

In the slightly modified structure seen in Figure 4, the same wheel structure is shown. I have also shown the same disk structure 20 with the underturned margins 21—21. The difference in structure lies in the formation of the spring elements.

In this instance, two separated arms 26—26 are provided for insertion through a single opening 8 in the body part of a wheel. Each of these elements is secured to the disk and at an end portion 23 is provided with an angle portion terminating in an apex 24, and a sloping contact portion 25, all as previously described.

However, inwardly of the contact portion 25, each of the spring elements 26—26 is bent inwardly towards the opposite element as indicated at 27—27, but the two separate arms are not joined to each other, there being an open space between the terminations of the ends 27—27. With such construction, the disk 20 is more easily removed from the wheel, if so desird, than is the structure shown in Figures 1, 2 and 3. The spring holding means illustrated in Figure 4, perform the same functions as the spring elements previously described herein.

In Figure 5, I have illustrated another modified form of holding means, the disk structure and the wheel structure both being illustrated in accordance with the previous description. In this instance, a plurality of brackets 27 are secured to the disk. The brackets are held to the disk in the manner previously described, namely, by end portions 23a clamped beneath the underturned margins 21—21 of the disk. The central portion of each bracket 27 is spaced away from the disk a suitable distance to accommodate a bolt and nut or equivalent means 28 which secures a spring-attaching element to the respective bracket.

In this instance, the spring attaching element 29 is also in the form of a deformed U, but the closing leg of the U is opposite to that seen in Figure 2. The closing leg of the U seats against the bracket 27. Each arm of the spring element is bent in similar fashion to those previously described, with an angle portion terminating at an apex 24 and a sloping contact portion 25 inwardly of the apex. Inwardly of the contact portions 25, the arms are inclined towards each other to provide sloping surfaces for initial contact with the body part of a wheel when the disk is snapped into position thereupon. It will be appreciated that each of the spring elements 28 function substantially in the manner of those previously described.

It will be noted that, if so desired, in all of the spring attaching means described herein the width of the ends 23 may vary and even assume substantially the form of a completely annular ring, if such structure is deemed more advisable. The arms will then, of course, project at spaced intervals from the respective rings. It will also be noted that various other methods of attaching the spring elements to the disk 20, such as welding, riveting, or other similar means, as shown in my aforesaid co-pending application, may be employed without departing from the principles of the invention.

From the foregoing, it will be apparent that I have provided a novel combination vehicle wheel and ornamental disk structure in which securing means are embodied rendering the disk very readily and easily attachable to the vehicle wheel in a most positive and effective manner. The attaching means not only center the disk relatively to the wheel but also prevent shifting of the disk relatively to the wheel and further urge the disk into tighter cooperation with the wheel at all times. It will also be apparent that the structure, especially the outer surface of the disk, may be economically provided with any suitable or desirable finish for decorative purposes, and that the complete structure may be economically and easily manufactured.

I am aware that many changes may be made and numerous details of construction may be varied through a wide range without departing from the principles of this invention, and I, therefore, do not purpose limiting the patent granted hereon otherwise than necessitated by the scope of the appended claims.

I claim as my invention:

1. As an article of manufacture, an ornamental disk for attachment to a wheel having a disk body part with an opening therein, a bracket secured to the inner face of said disk, and a pair of resilient arms attached to said bracket, said arms being deflectable towards each other to pass through the opening in the body part and expand beyond the limits of said opening into engagement with the body part at substantially opposite points relatively to said opening.

2. In combination, a wheel including an opening, an ornamental disk for attachment to said wheel over the side surface thereof, and a spring attaching element carried by said disk and comprising a pair of opposed arms yieldable towards each other to pass through an opening in the wheel and capable of extending beyond the boundaries of said opening on the opposite side of the wheel from said disk, said arms being integrally joined at a point which lies on the opposite side of the wheel from said disk when said disk is in position.

3. The combination with a wheel including rim and body parts, said body part having an annular series of apertures forming simulated spoke portions on said body part, of an ornamental disk adapted for disposition over the outer side surface of said wheel, and a plurality of concealed pairs of resilient arms secured to said disk adapted to extend through a number of said apertures into disk retaining engagement with said body part, each of said arms being yieldable in a direction extending radially of said wheel and being opposed to the other arm.

4. The combination with a wheel including rim and body parts, said body part having an annular series of apertures forming simulated spoke portions on said body part, of an ornamental disk adapted for disposition over the outer side surface of said wheel, and a plurality of concealed pairs of flat stock resilient arms secured to said disk adapted to be cammed through a number of said apertures into locking engagement with said body part upon axially moving said disk into assembled position on said wheel, one of each of said pairs of arms being adapted to yield away from the axis of said wheel during said camming operation and the other being adapted to yield towards said axis.

5. The combination with a wheel including rim and body parts, said body part having an annular series of apertures forming simulated spoke portions on said body part, of an ornamental disk adapted for disposition over the outer side surface of said wheel, and a plurality of concealed pairs of leaf spring arms secured to said disk adapted to extend through a number of said apertures into disk retaining engagement with said body part, each arm of each of said pairs being so disposed relative to its associated arm as to contact said body part at radially spaced points thereon, whereby vibration of said disk on said wheel is substantially eliminated.

6. An ornamental disk adapted to fit on and cover the side of a pressed steel wheel having spoke-simulating portions separated from each other by apertures, said disk having a central aperture to allow the hub cap of said wheel to project therethrough and the edges of said disk around the periphery thereof and around said central aperture being folded over towards each other on the back of said disk, and means secured by both of said folded-over edges and adapted to snap into said apertures in said wheel.

7. An ornamental disk adapted to fit on and cover the side of a pressed steel wheel having spoke-simulating portions separated from each other by apertures, said disk having a central aperture to allow the hub cap of said wheel to project therethrough and the edges of said disk around the periphery thereof and around said central aperture being folded over towards each other on the back of said disk, and means adapted to snap into said apertures in said wheel and including continuous members each having one end secured by each of said folded-over edges.

8. An ornamental disk adapted to fit on and cover the side of a pressed steel wheel having spoke-simulating portions separated from each other by apertures, said disk having a central aperture to allow the hub cap of said wheel to project therethrough and the edges of said disk around the periphery thereof and around said central aperture being folded over towards each other on the back of said disk, and spring fingers adapted to hook over the edges of said apertures in the wheel to retain said disk in place, each of said spring fingers having one end secured by one of said folded-over edges and having a portion bearing against said disk at a point several times as far from the edge of said disk as the width of said folded-over edge.

9. An ornamental disk adapted to fit on and cover the side of a pressed steel wheel having spoke-simulating portions separated from each other by apertures, said disk having a central aperture to allow the hub cap of said wheel to project therethrough and the edges of said disk around the periphery thereof and around said central aperture being folded over towards each other on the back of said disk, and omega-shaped springs having their ends secured by said folded-over edges and having their central loops projecting away from said disk and being adapted to be snapped into said apertures in said wheel.

10. In a wheel including a wheel body having circumferentially separated spoke portions and a tire rim, an ornamental cover for the wheel body comprising a disk-like plate having spaced portions of the wheel body intermediate the cealed resilient engagement with cooperating portions of the wheel body intermediate the spoke portions thereof, said cooperating portions each comprising a radially inner and a radially outer edge portion of an opening in the wheel body, and said spaced portions each comprising a resilient finger extending axially rearwardly and engaging an edge portion.

GEORGE ALBERT LYON.